United States Patent Office 3,231,811
Patented Jan. 25, 1966

3,231,811
DEVICES FOR CONTROLLING THE CHARGING OF A BATTERY FROM AN ALTERNATOR
Lucien Peras, Billancourt, France, assignor to Regie Nationale des Usines Renault, Billancourt, France
Filed Sept. 24, 1962, Ser. No. 225,515
Claims priority, application France, Oct. 6, 1961, 875,294
6 Claims. (Cl. 320—48)

It is known to charge the storage battery of an automotive vehicle from an alternator through a rectifying system such as a De Graetz bridge consisting of six diodes, and to provide means for controlling the operation of the system by means of a pilot lamp mounted on the instrument panel of the vehicle. In this case a so-called isolating diode is inserted either in the positive section of the alternator circuit or, according to a co-pending patent application filed by the same applicant for a pilot lamp mounting in the circuit for charging a battery from an alternator, in the negative section of the alternator circuit, the lamp being connected in series with a switch, the regulator and the alternator exciting winding so as to be lighted when said switch is closed but the alternator is inoperative, and to fade out and remain out when the alternator is started and delivers current, the lamp being thus short-circuited by the isolating diode.

However, this arrangement is attended by the inconvenience that no warning is given to the driver of the vehicle in case of failure in the excitation circuit. In fact, if a failure occurred in a shunt, a brush connection, an excitation winding, or in the regulator, the voltage across the terminals of the alternator would actually drop to zero but at the same time it would open the pilot lamp circuit which would thus be unsuitable for detecting any failure.

This invention provides an improvement in circuits of the type broadly set forth hereinabove, whereby a resistance is shunted on the excitation circuit of the alternator so that in case of failure in the excitation circuit, either at the regulator or at the alternator, a current will flow from battery to ground through the pilot lamp which will thus be lighted automatically.

This resistance is advantageously selected with a relatively high value to that under normal operating conditions it will absorb but a very small amount of current.

In order to afford a clearer understanding of this invention and of the manner in which the same may be carried out in practice, reference will now be made to the accompanying drawing illustrating diagrammatically two exemplary forms of embodiment of the invention. In the drawing.

Figure 1:
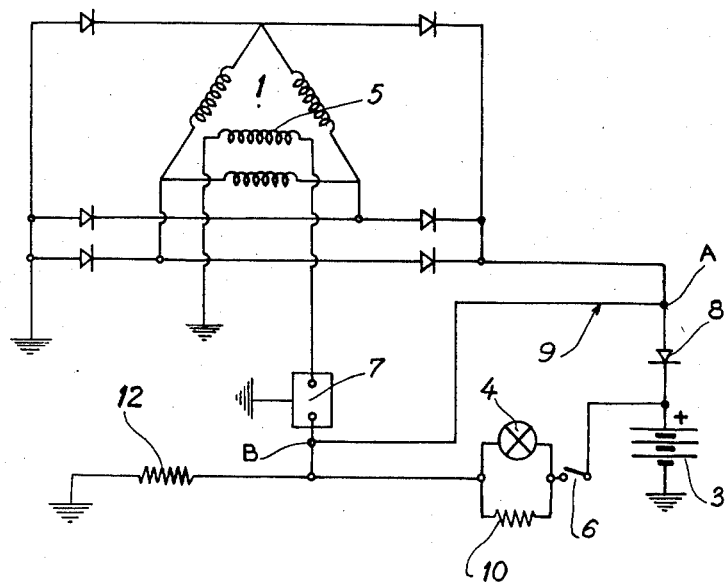
FIGURE 1 is a wiring diagram showing the mounting of the pilot lamp with the isolating diode in the positive section of the alternator circuit, an auxiliary resistance being associated with the pilot lamp according to the teachings of this invention.

In the arrangement of FIG. 1, the alternator 1 inserted in the De Graetz bridge comprising six diodes 2 charges a storage battery 3.

A pilot lamp is shunted on the circuit through a resistance 10 and disposed in the circuit section of the excitation winding 5 which comprises a conventional switch 6 (i.e. the ignition switch) and a regulator 7; the isolating diode 8 is disposed in the positive section of the alternator circuit, a conductor 9 connecting the input terminal of the regulator to the input terminal of diode 8.

From this diagram it is clear that the arrangement operates as follows: when the switch 6 is closed and the alternator 1 is not driven, no voltage is delivered therefrom and the pilot lamp 4 connected in series with the regulator and the excitation winding remains lighted, but when the alternator is started and delivers current the diode 8 short-circuits the pilot lamp which fades out and remains out.

As already stated hereinabove with this arrangement a circuit failure, whether in the regulator or in the alternator, cannot be detected.

According to this invention a resistance 12 is associated with the circuit by being inserted between the output terminal of the pilot lamp and the ground, so that when the alternator delivers current, the points A and B being at the same potential, the pilot light fades out and remains out; now if for any reason the excitation circuit were broken at the regulator or at the alternator, no current is delivered by the alternator and current flows through the filament of lamp 4 and resistor 12 to the ground.

Since current will constantly flow through this resistor, its value should be as high as possible but such as to ensure a sufficient energization of the lamp in spite of the voltage drop occurring across its terminals.

Figure 2:
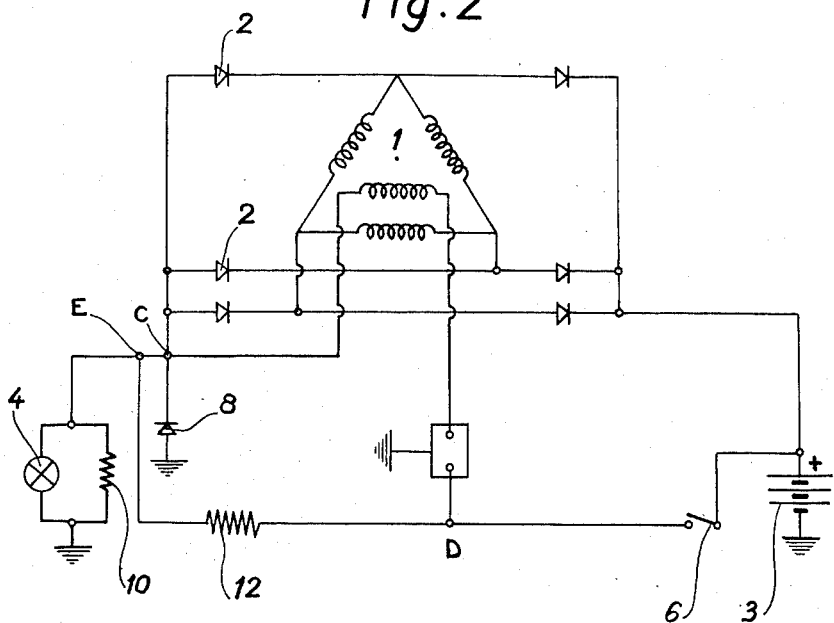
FIGURE 2 is a wiring diagram showing the mounting of the pilot lamp with the isolating diode in the negative section of the alternator circuit, an auxiliary resistance being also associated with the pilot lamp, according to an alternate embodiment of the invention.

FIGURE 2 illustrates the specific case in which the isolating diode and the pilot lamp are inserted in the negative section of the alternator circuit, as proposed in the aforesaid patent application. In this case the resistance 12 is inserted between point D (regulator input) and point E (input terminal of pilot lamp), this resistance actually shunting the regulator and the excitation winding; if any failure occurs in this circuit the lamp 4 will be energized through resistance 12 and thus warn the driver of this failure.

From the foregoing it is clear that by providing this additional resistance the pilot lamp can be re-lighted in case of failure in the excitation circuit of the alternator.

In practice, various modifications may be brought to the forms of embodiment shown and described herein, without however departing from the spirit and scope of the invention as set forth in the appended claims.

I claim:

1. A charging circuit comprising an alternator having excitation winding means and a plurality of secondary windings, said secondary windngs connected to the battery, regulating means and indicating means connected in series with said excitation winding means and the battery, resistor means connected in shunt with said regulating means and excitation winding for providing a current path for the battery and said indicating means when the battery is discharging, and said resistor means having a value small enough to enable enough current to pass through said resistor means to energize said indicating means when the battery has a predetermined voltage level.

2. A charging circuit as set forth in claim 1 wherein said indicating means comprises a resistor and a pilot light connected in parallel.

3. A charging circuit as set forth in claim 2 further comprising switch means connected between said light and said battery for selectively making and breaking the connection therebetween, and isolation means connected between said battery and said secondary windings.

4. A charging circuit as set forth in claim 3 further comprising a lead connected between said secondary windings and the connection common to said regulator means, said resistor means, and said light.

5. A charging circuit as set forth in claim 1 wherein said excitation winding means has a first and second terminal, said first terminal being connected to said regulating means, said indicating means comprising pilot light means connected to said second terminal, and said resistor means connected between said second terminal and the battery to form a current path which includes the battery, said resistor means, and said light means, clamping means connected to said second terminal for allowing current flow through said light means when the battery is discharging and preventing current flow through said light when the battery is being charged.

6. A charging circuit as set forth in claim 5 further comprising switch means connected between the battery and said regulator means for selectively making and breaking the connection between the battery and said regulator means and said resistor means, and a resistor connected in parallel with said light means.

References Cited by the Examiner
UNITED STATES PATENTS

| | | | |
|---|---|---|---|
| 3,022,456 | 2/1962 | Larson et al. | 322—99 |
| 3,138,751 | 6/1964 | Brewster | 322—73 |

LLOYD McCOLLUM, *Primary Examiner.*

R. C. SIMS, A. H. TISCHER, *Assistant Examiners.*